(12) United States Patent
Holmes et al.

(10) Patent No.: US 7,409,058 B2
(45) Date of Patent: Aug. 5, 2008

(54) DISPLAY COVER FOR A COMMUNICATION DEVICE

(75) Inventors: John Holmes, Waterloo (CA); Felipe Simoes, Kitchener (CA); Larry Hawker, Wateloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 529 days.

(21) Appl. No.: 10/856,808

(22) Filed: Jun. 1, 2004

(65) Prior Publication Data

US 2005/0265574 A1     Dec. 1, 2005

(51) Int. Cl.
*H04M 1/00*     (2006.01)
*H04M 9/00*     (2006.01)

(52) U.S. Cl. .................. 379/433.02; 379/433.04; 379/428.01

(58) Field of Classification Search ............ 379/428.01, 379/428.03, 433.01, 433.02, 433.04, 433.11, 379/433.12, 433.13, 440; 455/566, 569.1, 455/575.1, 575.3, 575.4, 90.2, 90.3, 575.8
See application file for complete search history.

(56) References Cited

U.S. PATENT DOCUMENTS

| | | | | |
|---|---|---|---|---|
| 5,768,370 | A | * | 6/1998 | Maatta et al. .......... 379/433.01 |
| 6,321,070 | B1 | | 11/2001 | Clark et al. |
| 6,553,119 | B1 | | 4/2003 | Mori |
| 6,594,472 | B1 | * | 7/2003 | Curtis et al. ............. 455/575.8 |
| D479,233 | S | | 9/2003 | Griffin |
| 6,807,433 | B2 | * | 10/2004 | Yamashita et al. .......... 455/566 |
| 6,847,806 | B2 | * | 1/2005 | Curtis et al. ................. 45/90.3 |
| 2001/0017663 | A1 | | 8/2001 | Yamagushi et al. |
| 2004/0077385 | A1 | * | 4/2004 | Makino et al. ........... 455/575.1 |
| 2004/0102231 | A1 | * | 5/2004 | Nuovo et al. ............. 455/575.1 |
| 2005/0221867 | A1 | * | 10/2005 | Zurek et al. ............. 455/569.1 |

FOREIGN PATENT DOCUMENTS

| | | |
|---|---|---|
| FR | 2798541 A1 | 9/1999 |
| GB | 2318476 | 4/1998 |
| KR | 1020010070355 | 7/2001 |
| KR | 1020020087847 | 11/2002 |
| WO | WO 2002/034006 A2 | 4/2002 |
| WO | WO 2004/054211 A1 | 6/2004 |

\* cited by examiner

*Primary Examiner*—Curtis Kuntz
*Assistant Examiner*—Phylesha L Dabney
(74) *Attorney, Agent, or Firm*—McCarthy Tétrault LLP

(57) ABSTRACT

A cover for a display device for a communication device is provided. The cover comprises: external dimensions shaped to fit said cover in a case for said communication device; a top surface; a bottom surface; a non-opaque region adapted to cover said display device allowing a user to see said display device; and a region defining a top of an enclosure cavity for a speaker associated with said communication device. Sound holes in the cover are preferably present. A recess around the region is provided for fitting with a cover for the recess. A communication device comprising the cover is also provided.

10 Claims, 5 Drawing Sheets

DISPLAY COVER FOR A COMMUNICATION DEVICE

FIELD OF INVENTION

The invention relates to a cover for a display, in particular a display cover of a communication device, such as a portable phone.

BACKGROUND

Typical voice communication devices, such as cellular phones, have a receiver transducer (speaker) located at a top portion of the device and a transducer (microphone) located at the bottom portion.

In designing a communication device, the speaker must be mounted within an enclosure. Typically, the enclosure is a plastic injection moulded piece. To fix the speaker within the enclosure, the top of the enclosure is frequently designed to provide a cover for the speaker. However, this approach limits aesthetic possibilities for the device as there are limitations to colour and texture treatments available for plastics typically used in casings.

There is a need for a display cover which provides an improvement over the prior art.

SUMMARY

In a first aspect, a cover for a display device for a communication device is provided. The cover comprises: external dimensions shaped to fit the cover in a case for the communication device; a top surface; a bottom surface; a non-opaque region to cover the display device allowing a user to see the display device; and a region defining a top of an enclosure cavity for a speaker associated with the communication device.

The cover may have at least one sound hole located about the region. The sound hole extends from the top surface through the cover to the bottom surface and connects to the enclosure cavity.

In the cover, the region may have a recess extending inwardly from the top surface into the cover. Further, a second cover may be provided to fit over the region. The second cover is shaped to allow passage of air from above the cover to the sound hole.

In a second aspect, an enclosure system for a communication device is provided. The enclosure comprises a case for enclosing elements of the communication device. The case has an opening for a display for the device in a first region and a structure to support a speaker for the device in a second region. The enclosure has a cover adapted to mate with the case. The cover has a top surface; a bottom surface; a non-opaque region adapted to cover the display device allowing a user to see the display device; and a support region for defining a top enclosure for a speaker associated with the device.

In the system, the cover may have at least one sound hole located in a region about the second region. The hole extends from the top surface through the cover to the bottom surface.

The system may have a second cover shaped to fit into the region and shaped to allow air access to the at least one sound hole from above the cover.

In the system, the case may have at least one cavity located about the structure; and an air channel to connect the cavity to the second region, such that the cavity is shaped to provide acoustic tuning for the speaker.

In a third aspect, a handheld communication device is provided. The device comprises: speaker; a display device; a housing having an opening to allow viewing of the display device therethrough; a second opening to allow placement of the speaker therein; and a cover being fixedly mountable to the housing. The cover has a first portion for covering the display device and a second portion adapted to acoustically transmit sound from the speaker.

In the device, a second cover may be provided which may be shaped to fit into the second portion and shaped to allow air to access at least one sound hole, which is located in the second portion, from above the cover.

In the device, the housing may further have a first cavity to provide acoustic tuning for the speaker, and an air channel connecting the first cavity to a region above the speaker. In the device, the first cavity may span both sides of the second opening.

In the device, the housing may further have a second cavity to provide acoustic tuning for the speaker, and a second air channel connecting the second cavity to a region below the speaker. In the device, the second cavity may span both sides of the second opening.

In the device, the housing may further have a third cavity to provide acoustic tuning for the speaker in combination with the first and the second cavities, and a third air channel connecting the second and third cavities.

In other aspects various combinations of sets and subsets of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes).

DETAILED DESCRIPTION OF AN EMBODIMENT

Figure 1A:
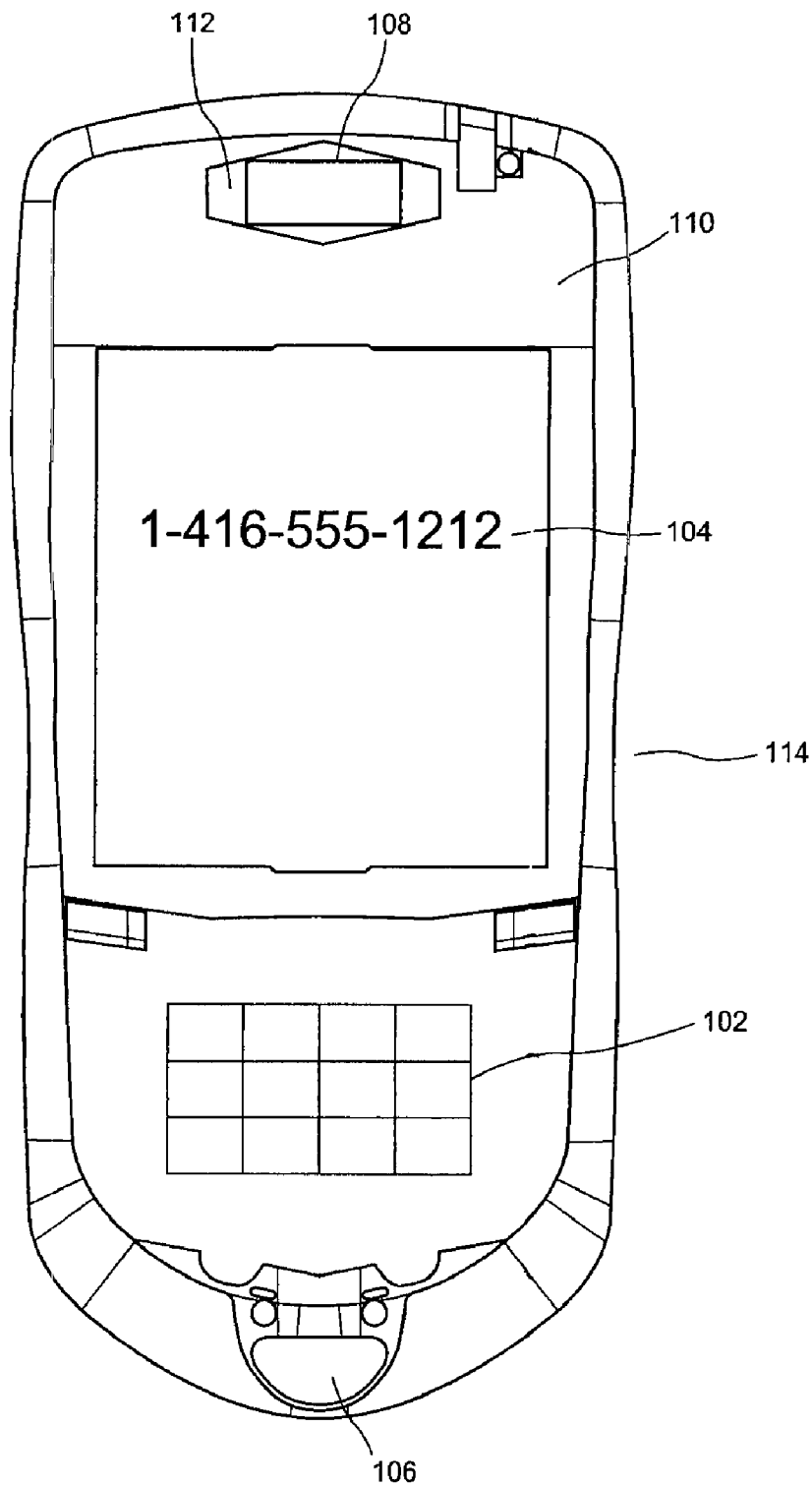
FIG. 1A is a top plan view of a communication device associated with an embodiment of the invention.

The description which follows, and the embodiments described therein, are provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

Figure 1B:
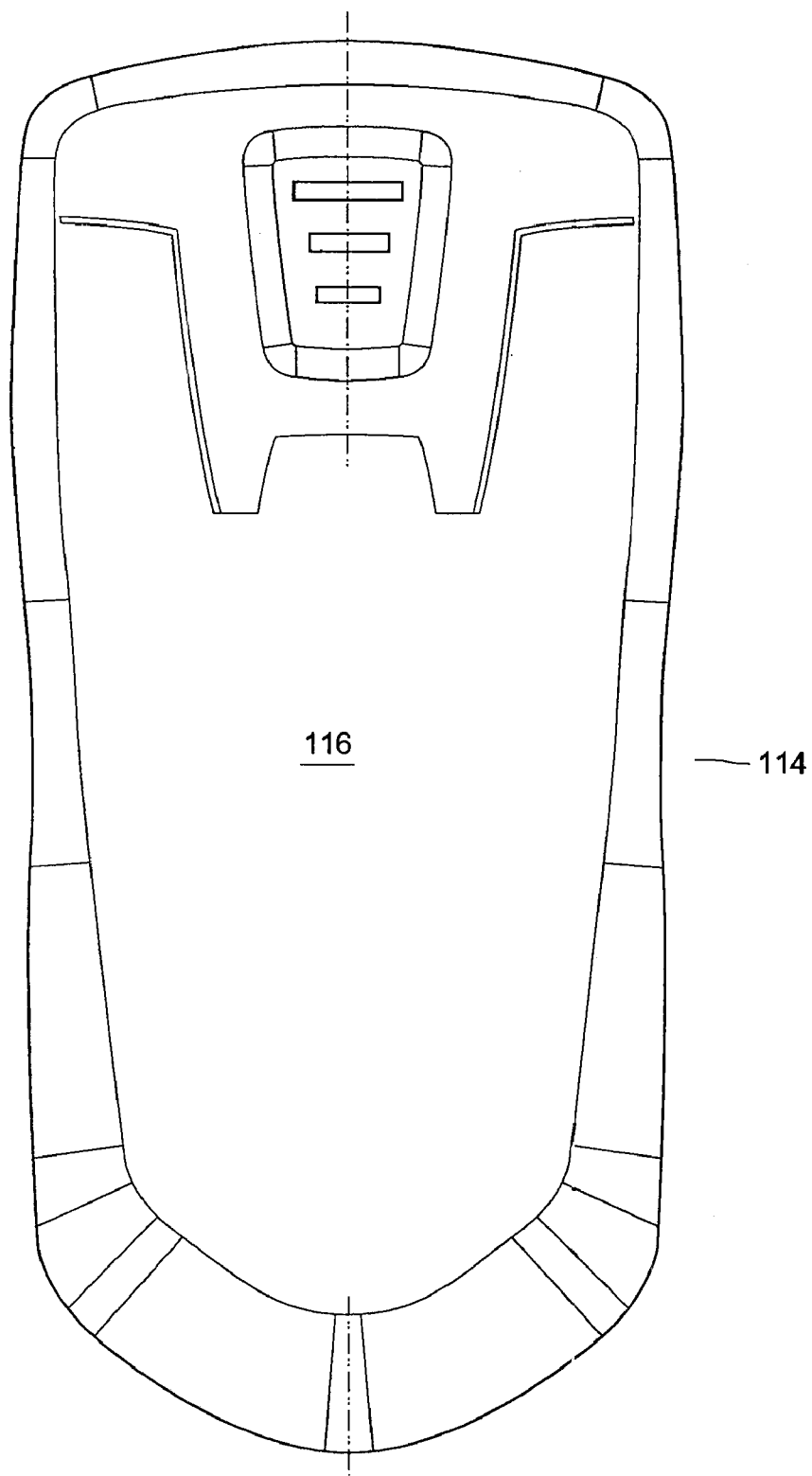
FIG. 1B is a bottom plan view of the communication device of FIG. 1A.

Referring to FIGS. 1A and 1B, communication device 100 is shown. In the embodiment, communication device 100 provides voice communications with other devices, allowing the user to hear audio signals (e.g. voices) transmitted from another device (e.g. a cellular phone). Device 100 may be a telephone, a cordless telephone, a cellular telephone, a voice-enabled personal digital assistant (PDA) or any other voice communication device. Communications may be provided via wireless systems, wired systems or a combination of both systems. As is common with voice communication devices, device 100 has a keypad 102, display 104, microphone 106 and transducer 108, i.e. speaker 108 all contained within an enclosure. Display 104 is an LCD device. Display cover 110 provides a transparent, translucent or non-opaque physical cover for the viewing area of display 104 and extends beyond it. Speaker cover 112 covers a recess in display cover 110. The recess is located above the installation location of speaker 108. Case 114 provides a physical enclosure for the electronics and mechanical elements for device 100. Back of case 114 is shown in FIG. 1B as bottom case section 116. General internal circuits and operations of device 100 are well known in the art and are not provided here.

Device 100 provides voice communications for a user in a familiar interface. To initiate a call, the user activates device 100, enters a telephone number to be called on keypad 102 and initiates the call. After the call is connected, the user places device 100 about his mouth and one of his ears, such that microphone 106 is near his mouth and speaker 108 is near his ear. User speaks towards microphone 106 and listens for sounds from the called party through speaker 108.

Figure 2:
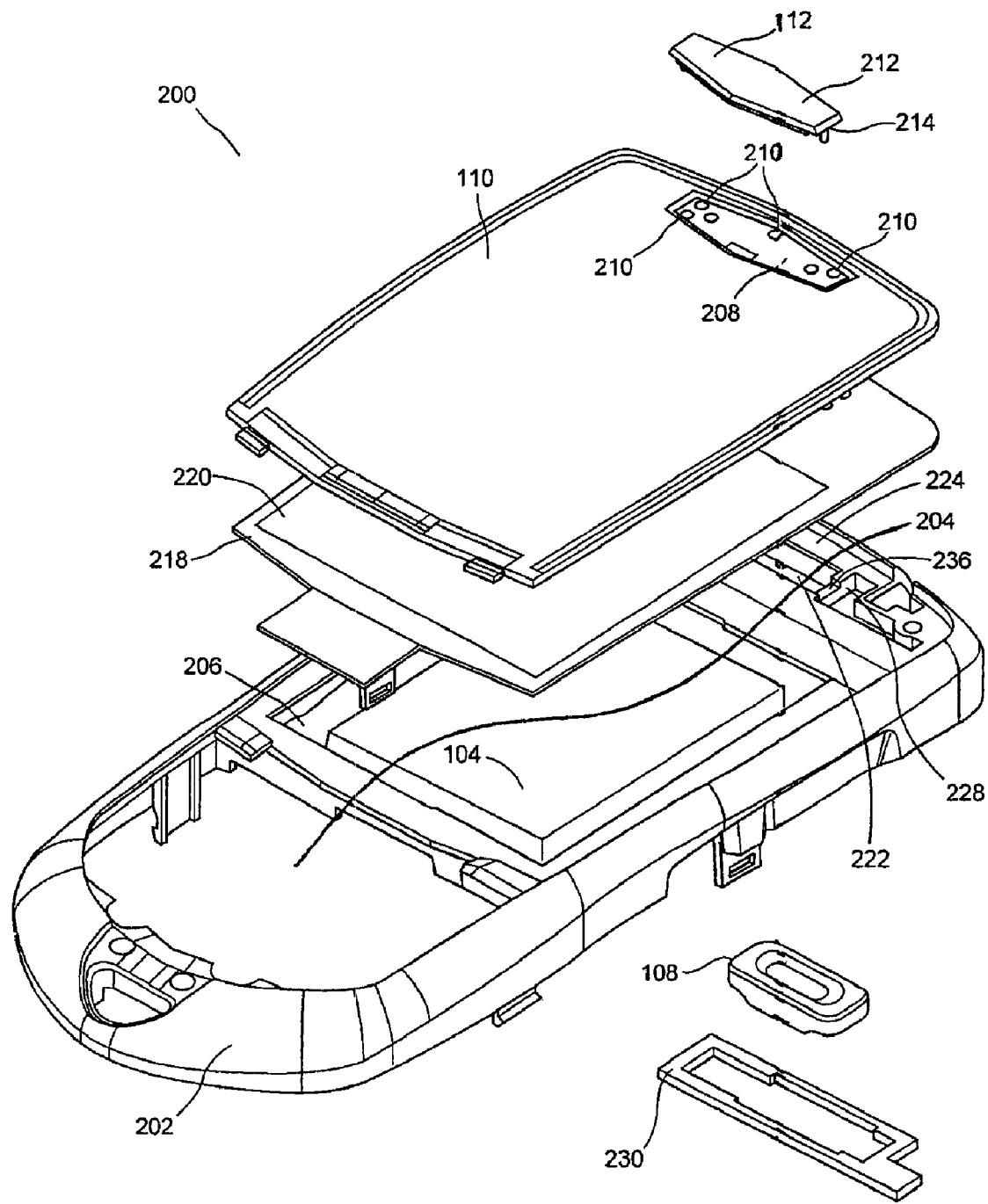
FIG. 2 is a top exploded perspective view of selected internal components and a case section of the communication device of FIGS. 1A and 1B.
Figure 3:
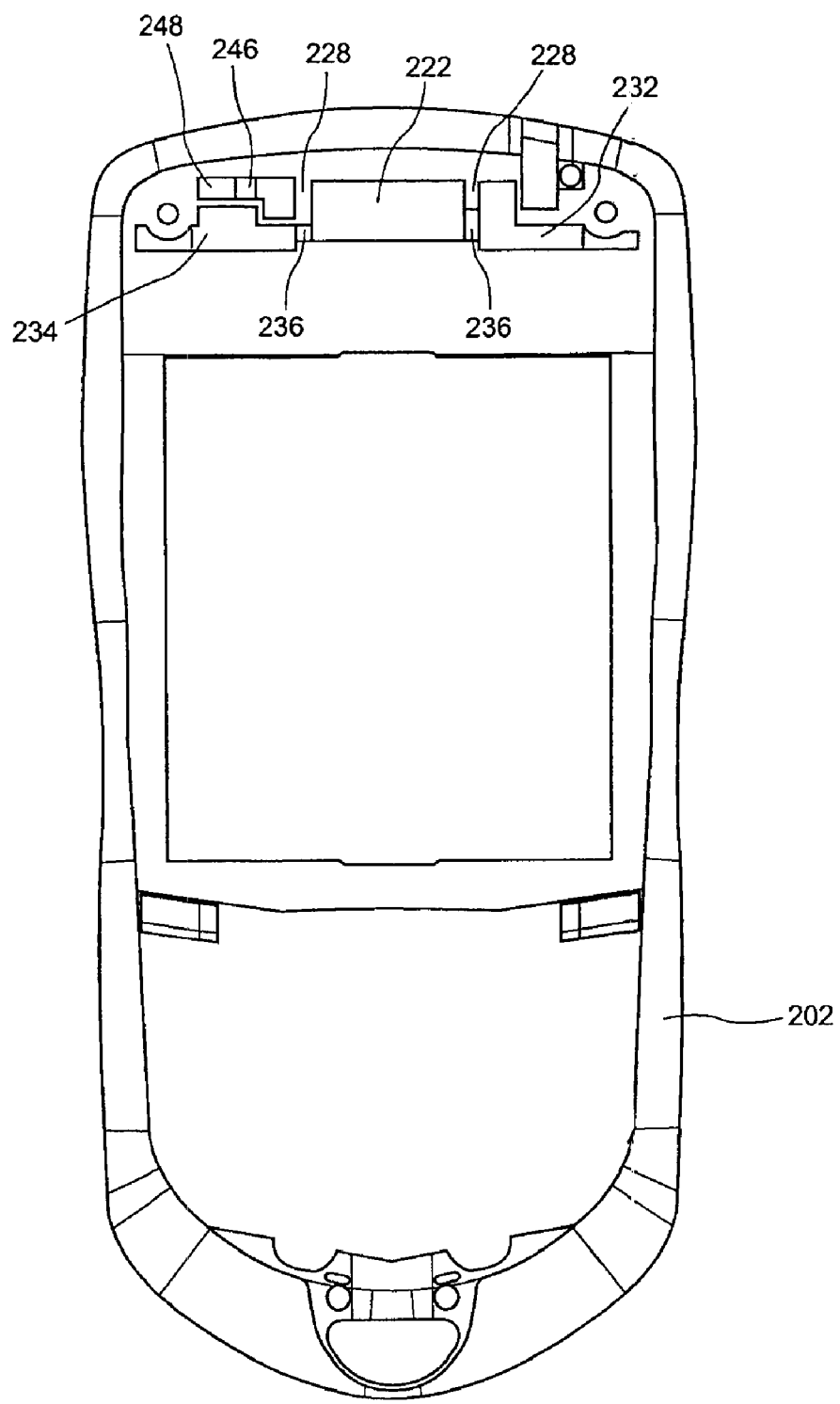
FIG. 3 is a top plan view of the case section of the communication device of FIG. 2.
Figure 4:
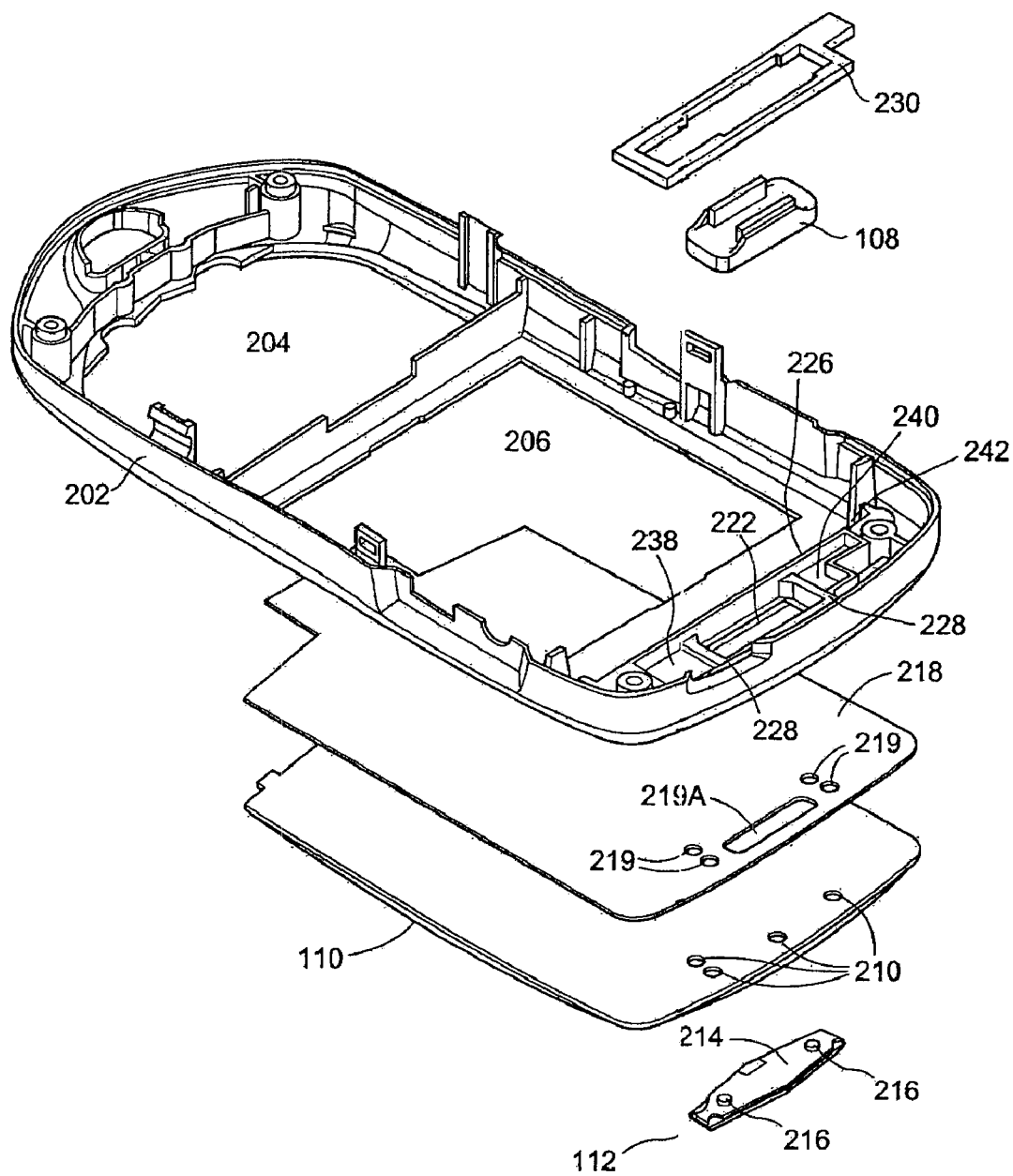
FIG. 4 is a bottom exploded perspective view of the selected internal components and the case section of FIG. 2.

Referring collectively to FIGS. 2, 3 and 4, view 200 provides an exploded top perspective view of internal and external elements in an upper portion of device 100. In particular, case 114 is comprised of top case section 202 and bottom case section 116 (FIG. 1B). Top case section 202 provides a one-piece cover for internal elements of device 100. Top case section 202 mates with bottom case section 116 along their respective sides. Various dimensions and fitting interfaces between top case section 202 and bottom case section 116 may be provided in other embodiments, including those known in the art. For example, alternative top and bottom case sections may generally have an exterior form as described in U.S. Design Pat. No. D479,233, which is incorporated herein by reference. Generally, top case section 202 is shaped to define the front face of device 100 and the top portion of the exterior edge of case 114. Top section 202 also provides internal bracing for structural support for device 100 and has two openings in its front face: opening 204 allows access to keypad 102 and opening 206 allows viewing of LCD 104. Top case section 202 is preferably a plastic moulded injected casing.

Display area of LCD 104 is covered by display cover 110, which fits into a recessed region shaped to receive cover 110 in the front of case section 202; however, display cover 110 further extends upwardly above LCD 104 to the top edge of case section 202. As such, display cover 110 provides a single seamless structure to cover both LCD 104 and speaker 108. Accordingly, case section 202 does not have to provide a top cover for speaker 108. Advantageously, display cover 110 may be silk screened with custom lettering or graphics around display area of LCD 104 and around the area where speaker 108 is located. For acoustic purposes, display cover 110 may be made of almost any material (such as plastic), as long as the material facilitates accurate manufacturing of display cover 110 and provides a transparent, translucent or non-opaque region where display 104 will be placed underneath.

Further detail is provided on the acoustic interface between speaker 108 and display cover 110. At a top region of display cover 110, recess 208 is provided, which is a shaped contour extending inwardly within display cover 110. In the embodiment, recess 208 is a hexagonal polygon depression having a generally stunted-hexagonal shape. The floor of recess 208 is generally flat. The exterior edges of recess 208 are bevelled downward to the floor. In other embodiments, other shapes may be provided for a recess. Recess 208 has four sound holes 210 therein which provide air conduits through display cover 110. As such, holes 210 allow passage of acoustic energy from speaker 108 through display cover 110 to the ambient environment outside device 100. Two sounds holes 210 are located in the upper and lower corners of the left side of recess 208, a third sound hole 210 is located in the upper corner of the right side of recess 208, and the fourth sound hole 210 is located in the upper area about the center of the recess 208. In other embodiments, more or less sound holes may be used. A sound hole has acoustics properties determined, in part, by its dimensions, including its diameter (i.e. cross-sectional area) and length (i.e. thickness of display cover 110 in recess area 208). In this embodiment, sound holes 210 are cylindrical in shape with round openings. Other shapes and cross sections may be used. While both dimensions are important for acoustic purposes, it is possible to adjust them together to achieve a particular acoustic characteristic. In other embodiments, the device may have other systems to port the sound energy from its speaker, thereby eliminating a need for sound holes.

Speaker cover 112 is shaped to fit within recess 208. As such in the embodiment, cover 112 is a stunted hexagonal shape. Speaker cover 112 provides a cover for sound holes 210, thereby enhancing the aesthetic appearance of display cover 110. Speaker cover 112 comprises upper section 212 and lower section 214. The bottom surface of lower portion 214 fits snugly against the upper surface of recess 208. The shape of upper section 212 and lower section 214 provide a corresponding excised notch where each sound hole 210 is located, to allow sound to emit from sound holes 210 into the ambient environment of device 100. The exterior edge of speaker cover 112 has an inward ridge which is shaped to provide a gap between speaker cover 112 and the bevelled edge of recess 208, when speaker cover 112 is located in recess 208. Speaker cover 112 also has nubs thereon protruding downward from its bottom surface. Within recess 208, corresponding concave depressions in locations opposite of the nubs are provided. Nubs 216 in speaker cover 112 fit cooperatively within depressions in recess 208 to assist in aligning speaker cover 112 within recess 208. Preferably, speaker cover 112 has a thickness such that when it is placed in recess 208, its upper surface is either flush or roughly flush with the top surface of cover 110.

It will be appreciated that in other embodiments, no recess is provided for the sound holes. Further, in other embodiments no cover is provided.

In order to secure display cover 110 to case section 202, adhesive display cover tape 218 is provided and is located between LCD 104 and display cover 110. Display cover tape 218 has double-sided adhesive thereon to affix its top surface to the bottom surface of display cover 110 and to affix its bottom surface to the top surface of case section 202. Display cover tape 218 is excised in area 220 so as to not obstruct view of LCD 104. For aesthetics, cover tape 218 is black, which enhances concealing of plastics elements beneath it and outlining of the display area of LCD 104. Display cover tape 218 has a transparent layer attached in area 220. After attaching tape 218 to display cover 110, the transparent layer is removed using a pull tab. Holes 219 and 219A are provided in tape 218 to allow continuity for an air channel between holes 210 and the interior of device 100. Hole 219A is an oblong opening and it located to be in line with sound hole 210 located in the upper middle region of recess 208. Four holes 219 are provided in a symmetric pattern about hole 219A to provide openings for the three sound holes 210 located on the exterior ends of recess 208. As such, tape 218 has a symmetric orientation of holes 219 thereon. As such, if tape 218 is placed either face up or face down over case section 202, one hole 219 will align with one sound hole 210.

Speaker 108 is located in case section 202 in upper region 222 of case section 202. Upper region 222 is generally underneath recess 208 and is bounded by internal structures in case section 202. Such structures include top wall 224, bottom wall 226 and side walls 228. The top surface of speaker 108 abuts against an internal lip at the top edge of walls 224, 226 and 228 to precisely provide an installed location for speaker 108 within region 222. The external dimensions of upper region 222 are provided to allow speaker 108 to fit snugly therein. Preferably, speaker 108 is mated to a rubber boot to assist in securely holding speaker 108 within upper region 222 and to block acoustic leaks around it.

Speaker seal 230 is provided to provide an acoustic seal in a cavity around speaker 108. It is located underneath speaker 108. Speaker seal 230 has opening 232 to allow electrical contacts of speaker 108 to engage with a PCB below it (not shown). Further detail on speaker seal 230 is provided below.

In case section 202, two acoustics cavities are provided around speaker 108 and upper region 222. Preferably, a front cavity located above speaker 108 and sound holes 210 define a Helmholtz resonator to tune high frequencies of speaker 108. Preferably, a back cavity is located behind speaker 108 and provides tuning for its lower frequency response.

The front cavity is defined in case section 202 by a volume including L-shaped cavity 232 and oblong cavity 234 and its sides and bottom surfaces are defined within case section 202. L-shaped cavity 232 and oblong cavity 234 are located immediately to the right and left of region 222, respectively. Notches 236 in side walls 228 connect L-shaped cavity 232 and oblong cavity 234 to a volume above speaker 108 to create a continuous volume for the front cavity. The bottom of the front cavity is defined by moulded floors in L-shaped cavity 232 and in oblong cavity 234 and by the top surface of speaker 108. The top of the front cavity is defined by the bottom surface of display cover tape 218. For the front cavity, tape 218 provides an acoustic seal between cover 110 and case section 202. It will be appreciated that display cover 110 provides additional structural support for the top of the front cavity. It will be appreciated that having a single piece to cover both display 104 and speaker 108 also provides a cost-effective component for device 100, as its part count is reduced.

The back cavity is defined in case section 202 by a volume including: box cavity 238, located immediately to the left of region 222; L-shaped cavity 240, located immediately to the right of region 222; and a volume directly beneath speaker 108. The sides and top surfaces are defined within case section 202. The top boundary of the back cavity is defined by the surface underneath floor of oblong cavity 234, the surface underneath floor of L-shaped cavity 232 and the bottom surface of speaker 108. The perimeter of the back cavity is defined by bottom wall 226 and the collective perimeters of box cavity 238, L-shaped cavity 240 and speaker 108. The perimeter is comprised in part by lower wall 224 and other wall extrusions descending inwardly from top wall 224. More specifically the perimeter is defined by the shape of L-shaped cavity 240, speaker 108 and box cavity 238. The bottom boundary of the back cavity is defined by bottom edge 242 of the perimeter defined by the end of lower wall 224 and the end of the other wall extrusions. Seal 230 is shaped to cover the perimeter defined by bottom edge 242 and fits snugly thereagainst. When device 100 is fully assembled, its PCB (not shown) is snugly fit against seal 230 and its PCB defines the bottom wall of the back cavity.

In the back cavity, bleed hole 246 is located in the ceiling of box cavity 238 and provides an air connection to an intermediate cavity 248 located about the front cavity. Preferably, intermediate cavity 248 is located in a front portion of case section 202 and its sides and bottom surfaces are defined within case section 202. Intermediate cavity 248 provides a port through display cover 110 via sound hole 210 located in the upper left of the recessed area 208. Bleed hole 246, intermediate cavity 248 and sound ports 210, provides further tuning of the acoustics using the front and back cavities. In other embodiments, the size, shape and location of a bleed hole can be modified relative to the top and back cavities to effect different acoustic tuning characteristics. The top of the intermediate front cavity 248 is defined by the bottom surface of display cover tape 218. For intermediate cavity 248, tape 218 provides an acoustic seal between cover 110 and case section 202. It will be appreciated that display cover 110 provides additional structural support for the top of the intermediate cavity.

It will be seen that in the embodiment, adhesive tape 218 provides an acoustic seal so that sounds from internal cavity 248 do not leak into any of upper region 222, L-shaped cavity 232 and oblong cavity 234.

It is preferable that the front cavity and intermediate cavity 248 are isolated from each other. As such, the location and dimension of their respective sound holes 210 in case section 202 and holes 219 in tape 218 are preferably made such that for each cavity, its associated sound hole 210 and hole 219 do not overlap with the either of the sound hole 210 or the hole 219 for the other cavity.

A notable feature of the embodiment is that display cover 110 forms part of the front cavity and part of intermediate cavity 248. By sealing display cover 110 to areas of case section 202 with double sided adhesive tape 218, the front cavity and intermediate cavity 248 are created, eliminating the need for use of an extra part.

The embodiment also has a small hole (not shown), approximately 0.75 mm diameter, through the PCB directly behind speaker 108. The hole is used to further tune the frequency response for speaker 108. The hole is covered with an acoustic mesh (e.g. a woven polyester material) to provide acoustic resistance and control resonance characteristics of the hole. Other types of mesh may be used or smaller holes could be drilled in the PCB to produce different acoustic characteristics. In other embodiments, mesh may be placed over one or more of sound holes 210. A nearly acoustically transparent mesh (i.e., a mesh having a very low acoustic resistance) may be used on sound holes 210 to prevent debris from entering device 100 through sound holes 210.

Other embodiments may use other shapes for their front and back cavities and may dispense with one or both of the cavities.

While the embodiment defines display cover 110 as being generally rectangular, in other embodiments, the display cover can be any shape and size, as long as it covers both the display region and the speaker of the communication device. Further, if the display and the speaker are not on the same face of a device, the display cover can be shaped to bend at the interface line between the two faces and cover both the display and the speaker.

Although the invention has been described with reference to certain specific embodiments, various modifications thereof will be apparent to those skilled in the art without departing from the scope of the invention as outlined in the claims appended hereto.

We claim:

1. An enclosure system for a communication device, said enclosure comprising:
    a case for enclosing elements of said communication device, said case having
        an opening for a display for said communication device in a first region;
        a structure to support a transducer in an enclosure cavity for said communication device in a second region;
        a first cavity defined in said structure to provide acoustic tuning for said transducer; and
        an air channel connecting said first cavity to a third region above said transducer;
    a first cover adapted to mate with said case, said first cover having
        a top surface;
        a bottom surface;
        a non-opaque region adapted to cover said display device allowing a user to see said display device;
        a support region for defining a top enclosure for said transducer; and
        at least one sound hole located about said support region, said at least one sound hole extending from said top surface through said first cover to said bottom surface and connecting to said enclosure cavity; and
    a second cover to fit over said support region, said second cover being shaped to allow passage of air from above said first cover to said at least one sound hole.

2. The enclosure system for a communication device as claimed in claim 1, wherein said support region has a recess extending inwardly from said top surface into said first cover.

3. The enclosure system for a communication device as claimed in claim 2, further comprising a layer of adhesive located between said first cover and said case to secure said cover to said case.

4. The enclosure system for a communication device as claimed in claim 3, wherein said opening is part of a recessed region in said case, said recessed region shaped to receive said first cover.

5. A handheld communication device comprising:
    a speaker;
    a display device;
    a housing having
        an opening for said display device in a first region;
        a structure to support said speaker in an enclosure cavity in a second region;
        a first cavity defined in said housing to provide acoustic tuning for said speaker;
        an opening to allow viewing of said display device therethrough;
        a second opening to allow placement of said speaker therein; and
        an air channel connecting said first cavity to a region above said speaker;
    a first cover having
        a first portion for covering said display device, said first cover being fixedly mountable to said housing, said first cover having a second portion adapted to acoustically transmit sound from said speaker; and
        at least one sound hole located in said second portion, providing an air channel from above said first cover, therethrough, to below said first cover; and
    a second cover shaped to fit into said second portion and shaped to allow air to access said at least one sound hole from above said first cover.

6. The handheld communication device as claimed in claim 5, wherein said first cavity spans both sides of said second opening.

7. The handheld communication device as claimed in claim 5, wherein said housing further comprises:
    a second cavity defined in said housing to provide acoustic tuning for said speaker, and
    a second air channel connecting said second cavity to a region below said speaker.

8. The handheld communication device as claimed in claim 7, wherein said second cavity spans both sides of said second opening.

9. The handheld communication device as claimed in claim 7, wherein said housing further comprises:
    a third cavity defined in said housing to provide acoustic tuning for said speaker in combination with said first and said second cavities; and
    a third air channel connecting said second cavity.

10. The handheld communication device as claimed in claim 7, further comprising a layer of adhesive located between said first cover and said housing to secure said first cover to said housing.

* * * * *